UNITED STATES PATENT OFFICE.

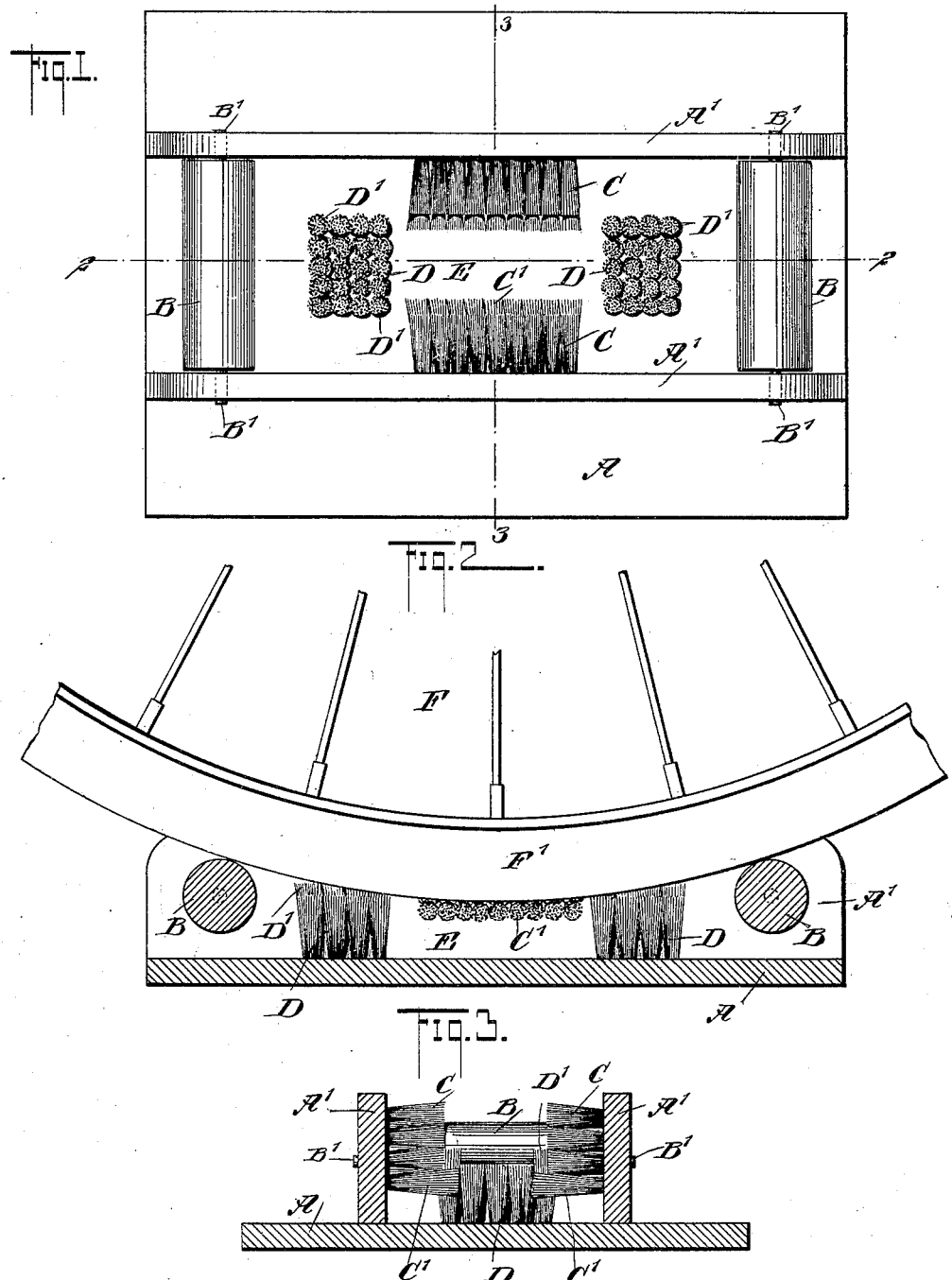

PEMBERTON DUDLEY, OF PHILADELPHIA, PENNSYLVANIA.

BICYCLE-BRUSH.

SPECIFICATION forming part of Letters Patent No. 668,168, dated February 19, 1901.

Application filed February 23, 1900. Serial No. 6,276. (No model.)

*To all whom it may concern:*

Be it known that I, PEMBERTON DUDLEY, a citizen of the United States, and a resident of Philadelphia, in the county of Philadelphia and State of Pennsylvania, have invented a new and Improved Bicycle-Brush, of which the following is a full, clear, and exact description.

My invention relates to brushes for cleaning the tires of bicycles and the like, and thus removing therefrom substances injurious alike to the tires themselves and to the floors, carpets, furniture, &c., with which the tires are adapted to come in contact.

The object of my invention is to provide an easily-operated and efficient brush for the above-indicated purpose, in the construction of which provision is made for avoiding hard wear and deformation of the brush and for minimizing the difference in action upon wheels of different sizes.

To this end my invention consists in the particular construction and arrangement of parts hereinafter described and claimed.

Reference is to be had to the accompanying drawings, forming a part of this specification, in which similar characters of reference indicate corresponding parts in all the figures.

Figure 1 is a plan of my improved brush; and Figs. 2 and 3 are sectional elevations thereof on lines 2 2 and 3 3, respectively, of Fig. 1.

The brush comprises a base, a support for the bicycle-wheel, and brushes adapted to engage the tire while it rests upon the support and revolves.

The base consists of a board A and of two parallel vertical walls A', in which are journaled at the ends, as at B', parallel rollers B. From the walls A' project inward the side brushes C, between which is left a space about equal to the width of a bicycle-tire, and the bottom bristles C' of these side brushes are longer than the others, as clearly shown in the drawings. Between the side brushes C and the supporting-rollers B there are secured to the board A bottom brushes D, projecting upward to the level of the bristles C' or a little higher, and the exterior rows of bristles D' are longer than the others. It will be observed that the side brushes C and bottom brushes D surround a free central space E. The upper surface of the rollers B is somewhat higher than the upper surface of the bottom brushes D.

Fig. 2 illustrates the mode of using my improved brush. Here the tire F' of the wheel F rests upon the rollers B and also engages the brushes C and D, the outer surface or tread proper of the tire being engaged by the long bristles C' and by the bottom brushes D, while the side surfaces of the tire are engaged by the long bristles D' and the side brushes C. It will be observed that but little weight comes on the brushes, as the rollers B act as a main support of the wheel, and thus the brushes are protected against deformation and excessive wear. By turning the wheel F about its axis the tire F' will be cleaned thoroughly. As the central space E is free, a difference in the diameter of the wheel will not affect the operation of the brushes materially, since it will be obvious that a difference in the size of the wheel will show its effect mostly at a point midway between the two supporting-rollers. Similarly the device will work with substantially equal effectiveness upon tires of different sizes.

Various modifications may be made without departing from the nature of my invention. Thus while I prefer to make the supports B rotatable, as described, I may glue or otherwise secure them rigidly to the side walls A' of the base. In this case, however, the friction opposed to the rotation of the wheel would be increased. It will be understood that the term "brush" will cover equivalents, such as mats or mops.

Having thus described my invention, I claim as new and desire to secure by Letters Patent—

1. The combination of the base the spaced parallel supporting-rollers, the longitudinally-alining, spaced bottom brushes located between the supports, one adjacent to each of the supports, the side bristles of said brushes projecting beyond the other bristles thereof, and the transversely-alining, spaced side brushes located centrally between the said supports and laterally of the space lying between the bottom brushes, so that the side brushes and bottom brushes inclose a free central space, the lower bristles of the side brushes projecting inwardly beyond the other bristles thereof.

2. The combination with the base, of two spaced bottom brushes disposed in longitudinal alinement and each consisting of a plurality of rows of bristles, the bristles of the outer rows projecting upwardly beyond those of the inner rows, and transversely-alining side brushes located laterally of the space lying between the bottom brushes and having a plurality of rows of bristles, the lower bristles of the side brushes projecting inwardly beyond the upper bristles.

In testimony whereof I have signed my name to this specification in the presence of two subscribing witnesses.

PEMBERTON DUDLEY.

Witnesses:
    FRED. TAYLOR PUSEY,
    WENDELL P. BOWMAN.